Nov. 18, 1958     D. L. BILLIAN     2,860,649
EMERGENCY SHUT-OFF VALVE
Filed Oct. 20, 1955
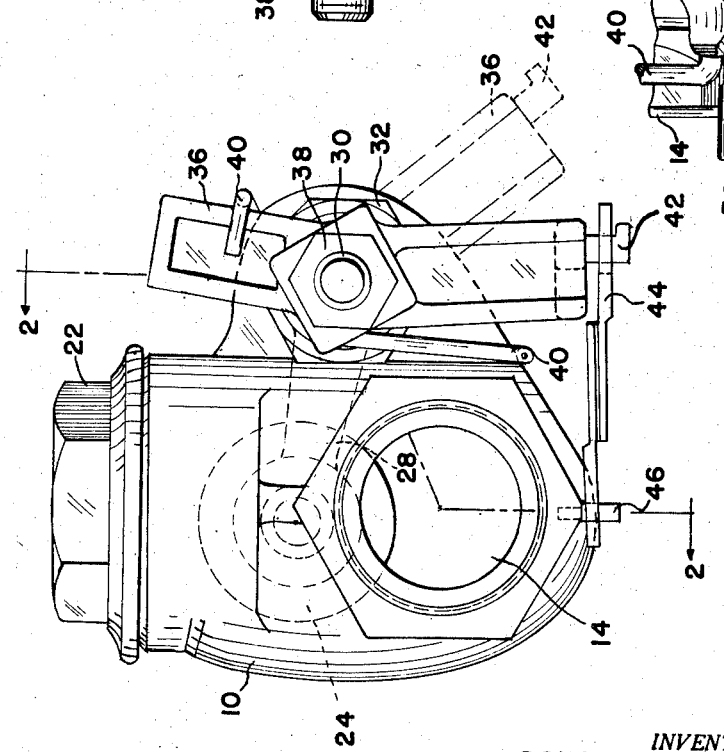
INVENTOR.
DONALD L. BILLIAN
BY Toulmin & Toulmin
ATTORNEYS ever the discharge pipe leading therefrom is subjected to a severe blow or is bent, the valve body will break at the weak section provided by the groove, thus detaching the fusible link and permitting the valve member to snap closed.

2,860,649

EMERGENCY SHUT-OFF VALVE

Donald L. Billian, Dayton, Ohio, assignor to Buckeye Iron & Brass Works, Dayton, Ohio, a corporation of Ohio Application October 20, 1955, Serial No. 541,774

2 Claims. (Cl. 137—75)

This invention relates to valves and, particularly, to emergency shut-off valves.

In connection with the transporting or handling of inflammable, corrosive, or extremely valuable fluids it becomes essential to guard as much as possible against accidental leakage of the liquid or fluid, particularly under emergency conditions.

For example, in connection with a truck transporting gasoline or the like it would be important to prevent loss of gasoline from the tank in the event of a mishap to the truck which might cause damage to the piping through which the gasoline is discharged from the tank.

Similarly, in the event of fire it would be important to prevent the gasoline from running from the tank out the pipes through which it is usually discharged.

The present invention proposes the provision of a valve for use in the circumstances referred to above which will prevent such undesirable or even dangerous loss of fluid or liquid from a container or pipeline under emergency conditions.

A primary object of this invention is the provision of a normally open valve which is arranged to close automatically under emergency conditions.

Another object of this invention is the provision of a valve which is normally open, but which can readily and quickly be closed by a simple manual operation in the event of emergency.

A further object of this invention is the provision of a valve of the nature referred to which will close very quickly and form a positive seal in the line in which it is located when the valve is released, either manually or because of certain emergency conditions.

A still further object of this invention is the provision of an emergency shut-off valve which is normally open, but which will automatically close in response to any of several stimuli that might arise under emergency conditions and, therefore, impart to the valves general utility as an emergency shut-off valve.

The several objectives referred to above are attained according to this invention by providing a valve having a swing gate therein which is biased toward its closed position by a spring mounted directly on the valve body. The valve member is held open by means of a fusible link attached between the valve body and valve member, and which fusible link, in addition to melting at a predetermined temperature and permitting the valve member to close, can also be detached from the valve body by fingertip pressure.

The fusible link referred to is located externally of the valve body in a position where it can also be broken mechanically and loosen the valve member, which might readily occur under emergency conditions.

The present invention still further provides a safety feature by locating a break-off groove in the valve body adjacent the outlet side thereof, and also between the main portion of the valve body and the point where the fusible link is connected thereto, so that whenever the valve receives a severe blow from some outside force, or whenever the discharge pipe leading therefrom is subjected to a severe blow or is bent, the valve body will break at the weak section provided by the groove, thus detaching the fusible link and permitting the valve member to snap closed.

The several objects and advantages of this invention will become more apparent upon reference to the following specification taken in connection with the accompanying drawings, wherein:

Figure 1 is an elevation of an emergency shut-off valve according to my invention;

Figure 2 is a section generally indicated on line 2—2 of Figure 1, but showing the valve member in its valve-closed position; and Figure 3 is a fragmentary view showing a modified construction.

Referring to the drawings somewhat more in detail, the valve according to my invention comprises the valve body 10 having an inlet port at 12 and a discharge port at 14.

The ports 12 and 14 are connected by channel 16 extending through the valve body, and which channel is provided with the spaced inclined valve seats 18 and 20 in about the center of the valve body.

Access is had to valve seats 18 and 20 for machining thereof through the open upper end of the valve body which is closed by the cap 22.

The valve also comprises a mechanism for closing off the valve seats, and which mechanism takes the form of a pair of interconnected disks, such as the female disk at 24 and the male disk at 26. These disks are shown in their valve-closing position in Figure 2 and in their valve-open position in Figure 1.

The disks 24 and 26 are supported, preferably with some freedom of motion, on the outer end of an arm 28 which may be referred to as a valve lifter, and which is connected at its end opposite the valve member with shaft 30 that has one end journalled in the valve body and its other end extending outwardly through side cap 32 to externally of the valve body. Sealing means prevent leakage from the valve body, such as the annular packing 34 which is also of a low friction nature so as to provide free movement of shaft 30 within side cap 32.

The outer end of shaft 30 carries a lever 36 fixed thereto as by nut 38. Between one end of lever 36 and the valve body there is disposed a helical torsion spring 40 which biases the mechanism connected with the valve member in a direction to urge the valve member closed. It will be noted that the end of spring 40 adjacent the valve body engages the valve body in the region of the center portion thereof.

The end of lever 36, opposite its connection with spring 40, terminates in a projection 42 over which is engaged one end of a fusible link 44, the other end of which engages a roll pin 46 extending out from a point on the flange of the valve body adjacent the outlet port 14. The fusible link 44 may be selected to fuse or fall apart at any desired temperature; 160° F. being the temperature employed when gasoline is the fluid to be controlled by the valve.

According to the present invention the valve body is provided with a groove 48 therein, located immediately inwardly of the outlet port 14 and between outlet port 14 and valve seats 18 and 20 in the center of the valve body which forms a weak section of the valve body so that, upon the valve body receiving a sharp blow, it will break off at groove 48 thereby releasing the lever 36 to the influence of spring 40 and snapping the valve closed.

Similarly, should the discharge conduit connected with port 14 be subjected to a sudden blow or be bent the valve will similarly break off at the groove and snap closed. It will be apparent that the groove 48 could be provided internally of the valve as shown, or be located externally thereof as indicated in Figure 3 where the groove, indicated at 48a, is provided by machining a groove of a proper depth about the neck of the valve body between the flange and the center part of the valve body.

In either case, it will be apparent that the loading at which the valve will snap in two can readily be controlled by the depth of the groove located in the valve body.

From the foregoing it will be apparent that the valve according to this invention will quickly snap closed, either upon breakage of the valve body at the break-off groove, or upon melting or breaking of the fusible link.

It will further be apparent that the fusible link 44 is so attached to the valve body that it can quickly be dislodged therefrom by fingertip pressure, thus providing means for quickly, manually snapping the valve closed. Due to the location of the fusible link 44 it is also subject to being broken under certain circumstances, and could even provide a remote shut-off merely by attaching a cord thereto to permit manual dislodging of the fusible link from a remote location.

The valve according to this invention is relatively simple to construct and can be installed into a conduit with no difficulty whatsoever. The valve is illustrated as having threaded connections at its opposite ends, but could as well be provided with a bolting flange connected at one or both ends.

It will be understood that this invention is susceptible to modification in order to adapt it to different usages and conditions, and accordingly it is desired to comprehend such modifications within the scope of the appended claims.

I claim:

1. In a normally open emergency shut-off valve for a tank used in the transportation of fluids; the combination of a valve body having a flow channel therethrough with an inlet port at one end of the valve body and an outlet port at the other end thereof for connection of the valve in a flow system, a valve seat in the channel between said ports, a valve member in said body movable toward and away from said seat thereby to close or open said channel, a lever external of the valve body connected with said valve member to move the valve member, a spring connected between the lever and valve body biasing the lever toward a position where the valve member is held in channel closed position, means having at least a portion thereof fusibly connected between the lever and a point on the end of the valve body adjacent the outlet port and holding the lever against the bias of the spring in position to locate the valve member in channel open position, said means becoming separated upon a rise in temperature to a predetermined level to release said lever, an annular frangible area about the valve body between the said point of attachment thereto of said means and the said valve seat to provide for breaking off of the outlet end of the valve body downstream from the said valve seat thereby to release said lever and permit closing of said valve upon the valve being subjected to a sharp blow, and means on the said point on the valve body so that one end of said fusible means is looped therearound whereby said fusible means may be selectively disconnected from the valve body at said point to permit releasing of said lever and the closing of the valve.

2. In a normally open emergency shut-off valve for a tank used in the transportation of fluids; the combination of a valve body having a flow channel therethrough with an inlet port at one end of the valve body and an outlet port at the other end thereof for connection of the valve in a flow system, a valve seat in the flow channel in the region of the center of the valve body, a valve member in the valve body movable into engagement with the seat to close said channel or away from said seat to open said channel, a lever external of the valve body connected with the valve member for moving the said valve member, a spring connected between the lever and the valve body biasing the lever in a direction to move the valve member into engagement with the valve seat, a fusible link detachably connected between the lever and a point on the end of the valve body adjacent said outlet port holding said lever in a position to locate said valve member in channel open position, and an annular zone of predetermined weakness about the valve body between the said point and the valve seat to provide for breaking off of the outlet end of the valve body from the remainder thereof under certain conditions thereby to release said lever to the influence of the spring and close the valve, the said point comprising a pin-like element projecting from the valve body at right angles to the link with one end of the link being looped over the pin-like element whereby the link can be selectively disconnected from the valve body to close the valve.

References Cited in the file of this patent

UNITED STATES PATENTS

| | | |
|---|---|---|
| 450,588 | Lunkenheimer | Apr. 14, 1891 |
| 1,164,436 | Wehmann | Dec. 14, 1915 |
| 1,751,705 | Mapes | Mar. 25, 1930 |
| 1,924,356 | Glab | Aug. 29, 1933 |
| 2,031,630 | Belknap | Feb. 25, 1936 |
| 2,048,387 | Johnsen | July 21, 1936 |
| 2,080,485 | Johnsen | May 18, 1937 |
| 2,630,818 | McRae | Mar. 10, 1953 |